UNITED STATES PATENT OFFICE 2,022,493

PROCESSES OF PREPARING GLYCERIDES

Carl W. Christensen, Chicago, Ill., assignor to Armour and Company, Chicago, Ill., a corporation of Illinois No Drawing. Application January 26, 1935, Serial No. 3,650

11 Claims. (Cl. 87—12)

This invention relates to processes of preparing mono and diglycerides and it comprises processes wherein metal glycerates are reacted with higher fatty acids; it further comprises processes of incorporating mono and diglycerides in various fatty or oily materials such as vegetable oils, edible shortening materials, mineral oils and the like wherein a metal glyerate is reacted with a higher fatty acid in the presence of the fatty or oily material so that the resulting glyeride is formed in situ in the fatty or oily material.

Mono and diglycerides of higher fatty acids are becoming of increasing technical and practical interest because of their pronounced emulsifying power. These materials all possess the following type formulae:

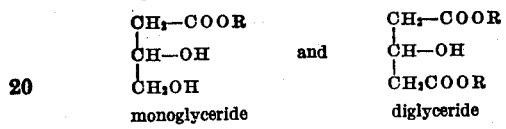

wherein R is a relatively long hydrocarbon and COOR is a higher fatty acid radical. Whereas an ordinary vegetable or animal fat is a triglyceride, that is, there are no free hydroxyl groups in the glycerine molecule, the mono and diglycerides always contain at least one such free hydroxyl group and it is likely that their marked emulsifying power is due, at least in part, to this molecular structure.

Within recent years it has been suggested to add small amounts of the mono and diglycerides to many different materials. For instance, the use of these glycerides in mineral oils has been patented. In this relation they confer beneficial properties on the resulting oil compound. For some time it has been known that edible oils such as shortening oils and fats can be improved by incorporating small amounts of these glycerides therein. Thus the melting point of the edible fat can be raised, and it can be made to emulsify more readily with water as in the manufacture of margarine. In still other instances, use of these particular glycerides in cosmetics, polishes, oily emulsions, etc., has been suggested.

Curiously enough, while the triglycerides are the common major constituents in most all animal and vegetable fats, the mono and diglycerides do not exist in nature. Because of the fact that until quite recently they were largely laboratory curiosities, relatively few methods for preparing them have been described. The classical method is that of reacting a glyceryl chlorhydrin with a fatty acid; another is that of reacting glycerine with definite predetermined quantities of free fatty acid, there being just enough present to react with one or two of the hydroxyls of the glycerine. Neither of these methods have been satisfactory. They are difficult to control, relatively high temperatures are required, and yield has left much to be desired. Of late it has been discovered that glycerine can be made to react with a triglyceride whereby mono and diglycerides can be formed. This reaction, when catalyzed by certain catalysts, is of practical, commercial importance.

I have now discovered a method of preparing the mono and diglycerides of the higher fatty acids which I regard as superior to that last described above. I have found that glycerine and higher fatty acids can be made to react with each other at relatively low operating temperatures, that a catalyst is unnecessary, that the reaction can be nicely controlled to give reaction products consisting almost entirely of mono or diglycerides or mixtures thereof in any definite desired ratio, and that the yield is substantially theoretical. While, in the process of the present invention I am in effect reacting glycerine with a higher fatty acid. I do not actually start with glycerine. My invention is based upon the discovery that a metal glycerate (sometimes called a glyceroxide) will react with a higher fatty acid. Thus, for instance, I react mono sodium glycerate with stearic acid and obtain monostearin. From di sodium glycerate and stearic acid I can obtain distearin. From di sodium glycerate and mixtures of fatty acids I can, for instance obtain a mixed stearin and palmitin diglyceride.

In its broadest aspects then, my invention relates to reactions of the following type:

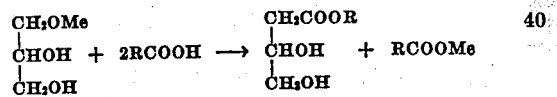

leading to the formation of monoglycerides. And

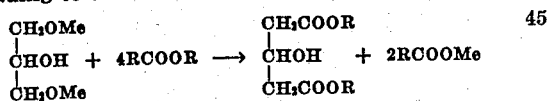

giving diglycerides. In each of the above reactions Me is to be considered an alkali metal and RCOOH is to be considered a higher fatty acid.

Of the alkali metal glycerates, I find it best to use sodium glycerate. It can be made in various ways. Metallic sodium can be dissolved in glycerine to give either the mono or di sodium derivative. Glycerine will also react with caustic soda (NaOH) to yield both the mono, and di derivatives. The tri compound is unknown so far as I am aware and I would not of course use it in my process since I obviously do not want to react all three hydroxyls of the glycerine with fatty acid. Potassium glycerates can be prepared in similar ways but the sodium compounds are considerably less expensive and hence better. However, this invention is not concerned with the making of the glycerates since the customary methods are entirely satisfactory.

Any of the higher fatty acids can be used in my process. By higher fatty acid I mean those fatty acids having six or more carbon atoms beginning with caproic. Thus, in the saturated series of fatty acids I can use caproic, caprylic, capric, lauric, myristic, palmitic, stearic, arachidic, behenic, carnaubic, cerotic, and melissic. These fatty acids are generally obtained from animal and vegetable sources in the well known ways. Caproic for instance is obtained from butter fat, others from cocoanut oil, stearic from tallow, and melissic from beeswax. I can use fatty acids of the oleic series of which oleic acid is the most important member, others being tiglic, physetoleic, rapic and erucic. The fatty acids of the linolic series are also suitable, the major one being linoleic and others being tariric and elaeomargaric.

In the reactions written above it is to be noted that the metal salts of the fatty acid (soaps) are by products of the reaction. In the ordinary use of my process I find it unnecessary to purify the glycerides by freeing them from the soaps formed. This is because my reaction products are generally used in very small amounts in edible oils etc. and the amount of soap present is so small as to be quite harmless. In fact, I find that it is actually beneficial. However, the reaction mass can be freed of soap in any convenient manner. The glyceride can be fractionally distilled from the soap under reduced pressure, or it can be selectively dissolved from the soap. Ether, for example, will dissolve the glyceride but not the soaps.

I shall now describe my invention with particular reference to the preparation of mono and distearin, it being understood, however, that I am not restricting myself thereto and that instead of starting with stearic acid I can start with any of the higher fatty acids noted above, or with mixtures thereof.

For the preparation of monostearin I make up a mixture containing about 114 parts by weight of mono sodium glycerate and about 525 parts by weight of stearic acid. This is a molecular ratio of one mol of glycerate to slightly less than two of acid. I then subject this mixture to moderate heating at a temperature of about 150° C. The temperature can range from 100° C. to about 200° C. or higher and is not critical, although I find it best to operate at low heating temperatures generally 100° to 150° C., since I can then definitely avoid any tendency toward the formation of undesirable decomposition products. Advantageously the mixture is stirred during the heating and heat is applied until small test portions withdrawn from time to time indicate that all free fatty acid has been consumed. The resulting reaction will contain about 385 parts by weight of monostearin, about 215 parts by weight of sodium stearate, and the rest being unreacted sodium glycerate. As noted above, there is a slight excess of glycerate at the start.

The proportions stated above can be varied over a moderately wide latitude. I can, for instance, use a slight excess of stearic acid at the start. Although the final reaction mixture will then contain a small amount of free acid this is not ordinarily objectionable. As previously described, relatively small amounts, of the order of 0.1 to 5 percent, of emulsifier (monoglyceride) are added to oils, margarine, etc., and the small amount of free acid, or soap, in such a small added quantity is not at all disadvantageous.

When making distearin it will be obvious that I simply regulate the amount of disodium glycerate and stearic acid so that it is approximately in accordance with the stoichiometrical proportions required. Thus I react about 136 parts by weight of disodium glycerate with about 1068 parts by weight of stearic acid. This is a molecular ratio of about 1 to 4 as required by the reaction written above. The conditions of heating are the same as for the preparation of monostearin.

It will of course be obvious that my process is susceptible of many modifications. Thus for instance, instead of using pure stearic acid, I can use lard fatty acids, and I can use mixtures of stearic and palmitic, stearic and lauric, and others. When I start with monosodium glycerate and a mixture of lard fatty acids I obtain a mixture of monoglycerides. When I start with disodium glycerate and a mixture of lard fatty acids I obtain mixed diglycerides. Hence, it will be obvious that my process can be made to yield mono and diglycerides of any desired higher fatty acid or any desired mixture thereof by simply proportioning the quantity and kind of fatty acid in a predetermined way.

So far I have described my invention with particular reference to the preparation of mono and diglycerides for addition to oils, fats, cosmetics and the like. I shall now describe a further modification wherein I form the glycerides in situ in the materials in which it is desired to incorporate small quantities of glycerides. This modification is especially advantageous in margarine manufacture but it is applicable to other products.

As an example, to an edible oil such as cocoanut, cottonseed or a hydrogenated oil of the type used in margarine manufacture I add a small amount of monosodium glycerate and higher fatty acid and heat the whole mass to about 150° C.–200° C. If it is desired that the final product shall contain say 1 percent of monoglyceride I regulate the proportions of glycerate and fatty acid (as described above) so that the final product will contain the desired amount. In an exactly similar manner I can form diglycerides, mixed diglycerides, and mixtures of mono and diglycerides in situ. In this case I am using a large volume of cottonseed oil for instance, as a diluent during the reaction. This method is especially advantageous when dealing with hydrogenated oils because the hydrogenated oil can be sent while still hot from the hydrogenator to another vessel wherein the fatty acid and glycerate can be incorporated. In this way the heat in the hot oil can be put to a useful purpose.

In another modification of forming the glycerides in situ I start with an edible oil containing free fatty acid. Ordinarily, it is necessary to purify edible oils such as cottonseed, soya bean and the like to remove any free fatty acid. In my invention I can avoid much of this purification and, at the same time, put the free fatty acid in the oil to use. Thus, as an example, I start with an edible oil containing about 2 percent of free higher fatty acid. To this oil I add enough mono or disodium glycerate to react with all of the free fatty acid in the oil. It will be understood, of course, that the oil containing the added glycerate is heated to reaction temperature as described above.

In a similar manner, I can start with an animal or vegetable oil or fat having a rather high content of free fatty acid, of the order of 10 percent. To this I add enough mono or disodium glycerate to give me a final product containing either mono or diglycerides or mixtures thereof by reaction of the glycerate with all of the free fatty acid. After heating the mixture to cause reaction, I then obtain a final product consisting of the oil or fat and a relatively high proportion of mono or diglyceride. This product can be considered as a kind of "master" batch and small portions of it can be added to other oils or fats when it is desired to incorporate glycerides therein. In this modification, I am of course avoiding the necessity for freeing an animal or vegetable oil or fat of free fatty acid. In effect, I am putting its fatty acid content to good use.

I wish to point out, however, that I am aware that others have "neutralized" free fatty acid in oils by reacting the acid therein with added glycerine and I make no claim to this Generally it is best that all substances used in the process of this invention be anhydrous or substantially so. The alkali metal glycerates are hygroscopic materials and it is desirable that they be dried before use. However, traces of water are not objectionable and in fact may possibly be helpful. Large quantities of water should be avoided. Commercial fatty acids are sufficiently "dry" and they need no further treatment to free them of water prior to use.

Although I have referred specifically throughout this specification to the use of alkali metal glycerates, it is to be understood that the alkaline earth metal glycerates are also operative. In edible products I do not ordinarily use the alkaline earth glycerates because of the cojoint formation of alkaline earth soaps as a by-product. However, these soaps, such as calcium and barium, can be removed from their admixture with the mono and diglycerides by distillation or the action of selective solvents. In some instances this is not even necessary, especially when very small amounts of glyceride are used as emulsifiers and the correspondingly small amount of calcium soap for example, would not be objectionable. Accordingly in the appended claims I mean the term "glycerate of an alkali-forming metal" to generically designate both the alkali and alkaline earth groups. Likewise, "higher fatty acid" denotes those acids of the saturated and unsaturated series having six or more carbon atoms.

Having thus described my invention, what I claim is:

1. In the process of preparing fatty esters of the class of mono and diglycerides the step which comprises heating, at a temperature of about 100° C. to 200° C., a mixture of a higher fatty acid and a glycerate of an alkali-forming metal, the glycerate having at least one free hydroxyl hydrogen.

2. In the process of preparing fatty esters of the class of mono and diglycerides the step which comprises heating, at a temperature of about 100° C. to 200° C., a mixture of higher fatty acid and an alkali metal glycerate having at least one free hydroxyl hydrogen.

3. The process of preparing a monoglyceride which comprises heating, at a temperature of about 100° C. to 200° C., a mixture of a higher fatty acid and mono sodium glycerate.

4. The process of preparing a diglyceride which comprises heating, at a temperature of about 100° C. to 200° C., a mixture of a higher fatty acid and a disodium glycerate.

5. The process as in claim 3 wherein the fatty acid is stearic.

6. The process as in claim 4 wherein the fatty acid is stearic.

7. The process as in claim 3 wherein the higher fatty acid is lard fatty acids.

8. The process as in claim 4 wherein the fatty acid is lard fatty acids.

9. In the process of preparing fatty esters of the class of mono and diglycerides the step which comprises reacting, at a temperature of about 100° C. to 200° C., a higher fatty acid and an alkali metal glycerate having at least one free hydroxyl hydrogen while in admixture with an edible fat or oil.

10. In the process of preparing fatty esters of the class of mono and diglycerides the step which comprises heating, at a temperature of about 100° C. to 200° C., a fat or oil containing added higher fatty acid and an alkali metal glycerate having at least one free hydroxyl hydrogen whereby said glycerides are formed in situ in said fats and oils.

11. In the process of preparing fatty esters of the class of mono and diglycerides the step which comprises providing a fat or oil containing free higher fatty acid, adding an alkali metal glycerate thereto, said glycerate having at least one free hydroxyl hydrogen, and heating the mixture at a temperature of about 100° C. to 200° C. whereby the glycerate reacts with the fatty acid and the glyceride is formed in situ.

CARL W. CHRISTENSEN